United States Patent

[11] 3,620,777

[72] Inventors Masanaga Okabe;
Toshio Yoshihara; Kenji Hamaoka, all of
Tokyo, Japan
[21] Appl. No. 843,828
[22] Filed July 22, 1969
[45] Patented Nov. 16, 1971
[73] Assignee Hooker Chemical Corporation
Niagara Falls, N.Y.
[32] Priority July 24, 1968
[33] Japan
[31] 43/51822

[54] CHROMATE CHEMICAL COATING SOLUTION
FOR ZINC ALLOY
4 Claims, No Drawings
[52] U.S. Cl. ..................................... 106/14,
117/127, 148/6.2, 252/79.2, 252/387
[51] Int. Cl. ....................................... C23f 11/00,
C09d 5/08

[50] Field of Search............................................ 106/14, 1;
148/6.2; 117/127; 252/387, 79.2

[56] References Cited
UNITED STATES PATENTS
2,777,785  1/1957  Schuster et al. ............... 148/6.2
2,965,551  12/1960  Richand ....................... 106/1 X
2,991,205  7/1961  Lincoln et al. ................ 148/6.2

Primary Examiner—Lorenzo B. Hayes
Attorneys—Stanley H. Lieberstein and William J. Schramm ABSTRACT: Chromate chemical coating solution for zinc or zinc alloy surfaces which comprising an aqueous acid solution having a pH within the range of 0.8 to 3.5, and containing 2.0 to 20 gram per litre of hexavalent chromium ion, at least 0.4 gram per litre of hydrazine hydrate or hydrazine salt and substantially no alkali metal ion, to obtain a superior coating with good corrosion resistance and good paint bonding quality.

CHROMATE CHEMICAL COATING SOLUTION FOR ZINC ALLOY

The present invention relates to a chemical coating solution for forming chromate conversion coating on the surface of zinc or alloys containing zinc, as their principal ingredients, to provide thereon a highly corrosion resistant coating suitable for paint base.

The above-mentioned "the surface of zinc or alloys containing zinc as their principal ingredients" will be hereinafter referred to as "zinc surface." The zinc surface includes the surfaces of hot dip galvanized steel; the so-called galvannealing steel which is made by annealing said hot dip galvanized steel to form zinc-ferrous alloy on the surface thereof; and electrogalvanized steel as well as substantially pure zinc articles and zinc base die casting articles.

As chemical coating solutions to form chromate conversion coatings on zinc surfaces, various kinds of aqueous solutions containing chromic acid, as their principal constituents, with the addition of sulfuric acid, hydrochloric acid, nitric acid, hydrofluoric acid, hydrofluosilicic acid or their salts, have been proposed up to the present time. However, because of no reaction end point being commonly recognized with these chromate conversion coating solutions during coating operations of zinc surfaces, chromic acid is contained excessively in the coating formed and therefore the said coating is colored deeply. Subsequently, when the coating is applied with paint, said excess chromic acid is caused to react with resinous components in the paint and it results in deterioration of the qualities of the coating, especially in inferior paint bonding quality.

Thus, these chromate conversion coating solutions and in turn the thus-formed coatings are not suitable for the paint base. By reason of the aforementioned deficiencies and under the influence of high temperature and humidity during the storing period, chromate conversion coatings on the surface of commercial galvanized steel often lack in the paint bonding quality when the paint is applied thereto, as it has been encountered by the users.

Further, in the manufacturing technique of galvanized strip coil which has been remarkably improved recently, the chromate coating treatment or the solution therefor should meet the requirement for the high speed strip line application and also for the changes of the line speed ranging widely from the highest speed to the lowest. With the conventional known coating methods or solutions, however, it is very difficult to obtain uniform consistent coatings on the strip in its varying line speed.

In order to solve these problems, several attempts have heretofore been made. One of them is the method to add to the coating solution one of ions such as, for instance, zinc ion, sulfric ion, chloric ion or nitric ion, together with trivalent chromium ion, and another one is a method to preheat the materials to be coated at a temperature higher than the boiling point of the coating solution containing zinc ion and hexavalent chromium ion. However, these methods can not be employed in the recent high speed galvanizing coil lines, because the former one is inferior in the corrosion resistance and paint bonding quality and the latter one is disadvantageous in the workability and economy. Further, there are some other methods to use noble metal ions or heavy metal ions, however, these methods are inferior in terms of economy as well as in the stability of the coating solutions and difficulties of forming the coatings themselves, and therefore these methods can not be adopted in such high speed strip line operations for mass production system.

The present invention provides a chromate conversion coating solution which enables to solve such problems as in the aforementioned conventional methods and is particularly suitable for the high speed galvanizing coil line applications. That is, the coating solution of the present invention is composed of chromic acid (hexavalent chromium ion) and hydrazine hydrate or hydrazine salts added as reducing agent. By the reducing agents, a part of hexavalent chromium ion is reduced to produce active trivalent chromium ion and, at the same time, nitrogen complex of trivalent chromium is formed in the aqueous acid solution of chromic acid, wherein addition of alkali metals are averted from the viewpoint of pH regulation. By using the coating solution of the present invention, the quantity of chromic acid, which is inevitably contained in the coating being formed, is controlled as required and consequently the coating having excellent corrosion resistance and paint bonding quality can be obtained on the zinc surface treated. As for the color of the coating which is a visual indicator of chromic acid content in the coating, the coating according to the present invention is observed to be substantially colorless or slightly yellow, and regardless of the color, if any, of the coating, there is no appreciable difference in its high corrosion resistance and excellent paint bonding quality or, in other words, overall quality of the coating obtained in accordance with the present invention is consistently uniform and excellent irrespective of the appearance of the coating as its characteristics.

The coating solution of the present invention contains 2.0–20 g./l. (gram per litre) of hexavalent chromium ion, calculated as $CrO_3$, at least 0.4 g./l. of hydrazine hydrate or hydrazine salt, calculated as hydrazine, and substantially no alkali metal ions, and is an aqueous solution of chromic acid having a pH within the range of 0.8–3.5.

The corrosion resistance and paint bonding quality will become inferior if the content of chromic acid is lower than 2.0 g./l. and the excessive content of chromic acid of more than 20 g./l. results in the excess of hexavalent chromium ion in the coating to cause lowering of the quality of the coating such as coloring and blister formation. The amount of 0.4 g./l. of hydrazine is the minimum value thereof to reduce a part of hexavalent chromium ion into trivalent chromium ion, to prevent the excess inclusion of hexavalent chromium ion in the coating and to keep the proportion of hexavalent chromium ion to trivalent chromium ion in a proper ratio, and as a matter of fact, it is the minimum value to keep the content of the reduced active trivalent chromium ion at least 0.5 g./l. Hydrazine salt to be used for the coating solution of the present invention will be properly selected from those such as hydrazine sulfate, hydrazine hydrochloride, hydrazine bromate and hydrazine phosphate etc. Uprise of pH by the excess dissolving of zinc results in degradation of the coating solution and shortening of the life thereof and in turn lowering of corrosion resistance of the coating formed. Therefore, the pH value of the coating solution is to be kept within the range of 0.8–3.5, with much importance on the upper limit, to maintain excellent overall quality of the solution. The existence of any matter, except zinc, to cause the rise of pH is not desirable and accordingly, an addition of alkali metal ion should be avoided.

In the following examples, the addition of the minimum 2 g./l of $H_2SiF_6$ is effective in the prevention of the coating being colored and in the improving of the corrosion resistance of the coating. The addition of the maximum 3 g./l. of zinc is effective to stabilize the coating property by keeping the content of zinc in, or the condition of, the solution substantially the same as that in the running state from the beginning at which the solution was made up to be ready for use.

EXAMPLE 1

The undermentioned aqueous solution was sprayed on a galvanized steel panel at a temperature of 60° C. for 15 seconds, and thereafter the remaining solution on the panel was rinsed off with water, and dried.

Solution:

| | |
|---|---|
| $CrO_3$ | 10 g. |
| Hydrazine hydrate (80%) | 1 g. |
| Sulfuric acid (98%) | 1.5 g. |
| Add water to make up 1 liter | |
| pH=1.3 | |

The coating thus formed did not produce any rust through 50 hours' 5 percent salt spray test.

The test panels to be coated and the coating conditions in the following examples 2–15 were just the same as those in this example.

Example 2
Solution:

| | |
|---|---|
| ZnO | 2 g. |
| $CrO_3$ | 10 g. |
| Hydrazine hydrate (80%) | 1 g. |
| Sulfuric acid (98%) | 1.5 g. |
| Add water to make up 1 liter | |
| pH=2.3 | |

The coating thus formed showed the same results as those in the example 1 through the same test.

Example 3
Solution:

| | |
|---|---|
| $CrO_3$ | 10 g. |
| Hydrazine hydrate (80%) | 1 g. |
| Hydrochloric acid (35%) | 3.2 g. |
| Add water to make up 1 litre. | |
| pH=1.4 | |

The same coating and test result as the example 1 were obtained.

Example 4
Solution:

| | |
|---|---|
| ZnO | 2 g. |
| Hydrazine hydrate (80%) | 1 g. |
| $CrO_3$ | 10 g. |
| Hydrochloric acid (35%) | 3.2 g. |
| Add water to make up 1 liter. | |
| pH=2.4 | |

The formed coating was the same as that in example 1.

Example 5
Solution:

| | |
|---|---|
| $CrO_3$ | 10 g. |
| Hydrazine sulfate | 2 g. |
| Add water to make up 1 liter. | |
| pH=1.4 | |

The formed coating was the same as that in example 1.

Example 6
Solution:

| | |
|---|---|
| ZnO | 2 g. |
| $CrO_3$ | 10 g. |
| Hydrazine sulfate | 2 g. |
| $H_2SiF_6$ (40%) | 10 g. |
| pH=1.3 | |

The same results as the example 1 were obtained.

Example 7
Solution:

| | |
|---|---|
| $CrO_3$ | 10 g. |
| Hydrazine hydrochloride | 1.6 g. |
| Add water to make up 1 liter. | |
| pH=1.3 | |

The coating showing the same corrosion resistance as in the example 1 was obtained.

Example 8
Solution:

| | |
|---|---|
| ZnO | 2 g. |
| $CrO_3$ | 10 g. |
| Hydrazine hydrochloride | 1.6 g. |
| $H_2SiF_6$ (40%) | 10 g. |
| Add water to make up 1 liter. | |
| pH=1.2 | |

The formed coating was colorless and the corrosion resistance was the same as that in the example 7.

Example 9
Solution:

| | |
|---|---|
| ZnO | 4 g. |
| $CrO_3$ | 20 g. |
| Hydrazine hydrochloride | 3.2 g. |
| $H_2SiF_6$ (40%) | 20 g. |
| Add water to make up 1 liter. | |
| pH=0.8 | |

The formed coating was the same as that in the example 8.

Example 10
Solution:

| | |
|---|---|
| ZnO | 1 g. |
| $CrO_3$ | 5 g. |
| Hydrazine hydrochloride | 0.8 g. |
| $H_2SiF_6$ (40%) | 5 g. |
| Add water to make up 1 liter. | |
| pH=1.7 | |

The formed coating was the same as that in the example 8.

Example 11
Solution:

| | |
|---|---|
| ZnO | 3.8 g. |
| $CrO_3$ | 10 g. |
| Hydrazine hydrochloride | 1.6 g. |
| $H_2SiF_6$ (40%) | 10 g. |
| Add water to make up 1 liter. | |
| pH=3.5 | |

The formed coating was the same as that in the example 8.

Example 12
Solution:

| | |
|---|---|
| $CrO_3$ | 10 g. |
| Hydrazine bromate | 1.7 g. |
| Add water to make up 1 liter. | |
| pH=1.4 | |

The same result as in the example 1 was obtained.

Example 13
Solution:

| | |
|---|---|
| ZnO | 2 g. |
| $CrO_3$ | 10 g. |
| Hydrazine bromate | 1.7 g. |
| $H_2SiF_6$ | 10 g. |
| Add water to make up 1 liter. | |
| pH=1.3 | |

The formed coating was the same as that in the example 8.

Example 14
Solution:

| | |
|---|---|
| $CrO_3$ | 10 g. |
| Hydrazine phosphate | 4 g. |
| $H_2SiF_6$ (40%) | 5 g. |
| Add water to make up 1 liter. | |
| pH=1.5 | |

The formed coating was the same as that in the example 8.

Example 15
Solution:

| | |
|---|---|
| ZnO | 2 g. |
| $CrO_3$ | 10 g. |
| Hydrazine phosphate | 4 g. |
| $H_2SiF_6$ | 10 g. |
| Add water to make up 1 liter. | |
| pH=1.3 | |

The formed coating was the same as that in the example 8.

In the above-mentioned examples, in order to compare the effects of the coating solution of the present invention, i.e. the effects and colors of the coatings formed in accordance with the present invention, the Examples were carried out by employing the same test pieces (galvanized steel panels) and the same treating conditions, however the present invention is by no means limited to these materials and treating conditions thereof.

For example, when the spraying technique is applied to the treatment, the temperature may be within the range of 50°–70° C. and the spraying time may be 10–30 seconds in accordance with the line speed of strip coil, and when the coating solution is applied by immersing, the process can be carried out, for example, dipping for 1-2 minutes at room temperature. Of course, other several treating conditions may be selected in compliance with the case.

To form colorless chromate coating on zinc surface is possible by the addition of, for example, hydrofluosilicic acid, however as the property of the coating is degraded, it may not be desirable.

The characteristic feature of the present invention is to provide a novel coating solution which gives superior coatings having excellent corrosion resistance and paint bonding quality as well as the colorless coatings. This characteristics can be obtained by the addition of hydrazine hydrate or hydrazine salts to reduce chromic acid, and such results can not be attained by the reduction with alcohols.

In other words, hexavalent chromium ion is reduced into trivalent chromium ion by the addition of hydrazine hydrate or hydrazine salts to control the content of hexavalent chromium ion in the coating layer which result in the prevention of ill effect in the paint bonding quality, and at the same time chromium complex with nitrogen compound is formed in the solution which remarkably improves the rust preventing property of the coating formed. In the following table, the characteristic features of the present invention are shown comparing with those of the ordinary coating solutions.

What is claimed is:

1. Chromate chemical coating solution for zinc or zinc alloy surfaces which comprising an aqueous acid solution having a pH within the range of 0.8 to 3.5, and containing 2.0 to 20 gram per litre of hexavalent chromium ion, calculated as $CrO_3$, at least 0.4 gram per litre of hydrazine hydrate or hydrazine salt, calculated as hydrazine, and substantially no alkali metal ion.

2. Chromate chemical coating solution for zinc or zinc alloy surfaces as claimed in claim 1, in which said hydrazine salt is a compound selected from the group consisting of hydrazine sulfate, hydrazine hydrochloride, hydrazine bromate and hydrazine phosphate.

3. A method for coating zinc and zinc alloy surfaces which comprises contacting the zinc-containing surface to be coated with the coating solution as claimed in claim 1 and maintaining the surface in contact with said solution, without the application of electrical current, for a period sufficient to form a chromate chemical conversion coating thereon.

4. The method as claimed in claim 3 wherein the hydrazine salt in the coating solution used is selected from hydrazine sulfate, hydrazine chloride, hydrazine bromate, and hydrazine phosphate.

COMPARISON IN COATING SOLUTIONS AND COATINGS THEREFROM

| | $Cr^{+3}$ (not reduced) | $Cr^{+3}$ (reduced by alcohol) | $Cr^{+3}$ (reduced by hydrazin) |
|---|---|---|---|
| Constituents of solution (g./l.) | Chromic acid—8<br>Chromium chloride—3.1<br>Hydrofluosilicic acid (40%)—10<br>Zinc oxide—2 | Chromic acid—10<br>Methanol—4.5<br>Hydrochloric acid—2.9<br>Hydrofluosilicic acid (40%)—10<br>Zinc oxide—2 | Chromic acid—10<br>Hydrazine hydrochloride—1.6<br>Hydrofluosilicic acid (40%)—10<br>Zinc oxide—2 |
| Salt spray test (Rusting states), hrs { 24<br>48<br>72<br>96<br>120 | 30–40% white rust<br>40–50% white rust<br>60–70% white rust<br>80–90% white rust<br>100% white rust | 30–40% white rust<br>50–60% white rust<br>80–90% white rust<br>100% white rust | Not changed.<br>Do.<br>10–20% white rust.<br>20–30% white rust.<br>50–60% white rust. |
| Color of coatings | Colorless–light yellow | Colorless–light yellow | Colorless–light yellow. |